(12) United States Patent
Kramers

(10) Patent No.: US 6,540,954 B1
(45) Date of Patent: Apr. 1, 2003

(54) PROCESS FOR FABRICATING A ROWING SHELL

(75) Inventor: Dirk Kramers, Tiverton, RI (US)

(73) Assignee: Resolute Racing Shells, Inc., Bristol, RI (US)

( * ) Notice: Subject to any disclaimer, the term of this patent is extended or adjusted under 35 U.S.C. 154(b) by 0 days.

(21) Appl. No.: 09/618,713

(22) Filed: Jul. 18, 2000

Related U.S. Application Data
(60) Provisional application No. 60/146,497, filed on Jul. 30, 1999.

(51) Int. Cl.[7] .................. B29C 70/144; B29C 33/76
(52) U.S. Cl. .................. 264/512; 264/257; 264/258; 264/314; 156/245; 249/205
(58) Field of Search .................. 264/510, 511, 264/512, 516, 314, 257, 258, 313; 249/205; 156/245

(56) References Cited

U.S. PATENT DOCUMENTS

| | | | |
|---|---|---|---|
| 2,956,292 A | | 10/1960 | Newsome |
| 3,611,461 A | | 10/1971 | Wurzberger |
| 4,065,820 A | * | 1/1978 | Starratt, Jr. .................. 9/6 P |
| 4,094,027 A | * | 6/1978 | Vernon .................. 9/6 P |
| 4,099,280 A | * | 7/1978 | Hoppe et al. .................. 9/6 P |
| 4,118,814 A | * | 10/1978 | Holton .................. 9/6 P |
| 4,131,962 A | | 1/1979 | Vernon |
| 4,563,321 A | * | 1/1986 | Gessford .................. 264/255 |
| 4,681,060 A | | 7/1987 | Masters |
| 5,016,557 A | | 5/1991 | Miller |
| 5,023,042 A | * | 6/1991 | Efferding .................. 264/511 |
| 5,042,416 A | | 8/1991 | Arcouette |
| 5,067,426 A | | 11/1991 | Vespoli et al. |
| 5,094,607 A | | 3/1992 | Masters |
| 5,120,480 A | * | 6/1992 | Anderson .................. 264/46.5 |
| 5,279,239 A | | 1/1994 | Vespoli et al. |
| 5,304,057 A | * | 4/1994 | Celerier et al. .................. 425/389 |
| 5,458,844 A | | 10/1995 | MacDougall |
| 5,474,008 A | | 12/1995 | Vespoli et al. |
| 5,517,934 A | | 5/1996 | Brown |
| 5,526,767 A | * | 6/1996 | McGuiness et al. .................. 114/357 |
| 5,534,203 A | * | 7/1996 | Nelson et al. .................. 264/101 |
| 5,756,034 A | * | 5/1998 | Newton et al. .................. 264/258 |
| 5,837,185 A | * | 11/1998 | Livesay et al. .................. 264/511 |
| 5,913,995 A | * | 6/1999 | Dougherty .................. 156/210 |
| 6,264,877 B1 | * | 7/2001 | De La Barriere .................. 264/516 |
| 6,270,104 B1 | * | 8/2001 | Nelson et al. .................. 280/281.1 |

* cited by examiner

*Primary Examiner*—Stefan Staicovici
(74) *Attorney, Agent, or Firm*—Salter & Michaelson

(57) ABSTRACT

A process for fabricating a boat shell having a hull and deck molded together as a unitary piece in a single molding step is provided. A two part mold is provided including a first and a second mold half. Prior to molding the two halves are separated and materials which are used to form the inner layer, core and outer layer of the shell, are laid up within each half. Cooperative inserts are also removably secured to opposing upper and lower edges of the first and second mold halves. The inserts are then removed, a vacuum is created within the mold, and the shell is heated until cured. By overlapping and curing the port and starboard sides, the two sides become molded in a permanent manner such that the deck and hull of the boat are formed together as a unitary boat shell in a single molding step.

18 Claims, 3 Drawing Sheets

PROCESS FOR FABRICATING A ROWING SHELL

RELATED APPLICATIONS

This application claims priority under 35 U.S.C. §119(e) to co-pending U.S. provisional Application Ser. No. 60/146,497, filed on Jul. 30, 1999.

DESCRIPTION

1. Technical Field

The invention relates generally to a process for fabricating a boat shell, and more particularly to a process for making a rowing shell having a hull and deck molded together as a unitary member in a single molding step.

2. Background of Related Art

The performance of boat hulls, for example hull configurations for rowing shells, depends on a number of factors. Among these factors are the stiffness or rigidity of the rowing shell, the weight, stability, durability and amount of drag or resistance in the water. These factors play an especially important role during racing where optimization of one or more factors can lead to a competitive advantage. Due to the extreme slenderness of rowing shells, and rowing sculls in particular, optimizing the performance of such boats poses a unique challenge. Although the configuration and materials utilized in rowing sculls have advanced considerably in the past years, a need continues to exist for further improvement to increase overall performance. Often, however, optimizing one area, such as low weight, leads to a disadvantage in another area, such as durability.

In addition to maximizing performance, manufacturing such rowing shells is often costly and labor intensive. Therefore, it is also desirable to improve fabrication techniques while also working toward improved performance.

Accordingly, it is an object of the present invention to provide a process for fabricating an improved rowing shell having a hull and deck formed together as a unitary member in a single process for improved performance.

SUMMARY

In accordance with the present invention, there is provided a process for fabricating a rowing shell having a hull and deck molded together as a unitary piece in a single process for improved performance. To form the boat shell, a two part mold is preferably provided that includes a first mold half and a second mold half which are mirror images of each other. In an open position, prior to molding, the two halves are separated and materials which are used to form the inner layer, core and outer layer of the shell, such as pre-impregnated carbon fiber and a honeycomb matrix, are laid up within each mold half. Before laying up the material within the mold, cooperative inserts are removably secured to opposing upper and lower edges of the first and second mold halves. The inserts are provided to facilitate joining the first and second halves of the boat shell together along a centerline during molding, by allowing ends of the inner and outer layers of material in the first mold half to overlap ends of the inner and outer layers of material in the second mold half. After lay up is complete, the inserts are removed and the mold is closed by bringing the opposing upper and lower edges of the mold halves together, with the material in one mold half defining the port side of the boat from bow to stern and the material in the other mold half defining the starboard side of the boat from bow to stern. Once closed, the material overhanging in one mold half overlaps the material overhanging in the other mold half in order to form a reinforced seam along the centerline of the boat shell. A vacuum bag, which is placed within the mold on the inside of the boat shell, is then used to create a vacuum within the mold, and the boat shell is heated until cured. By overlapping and curing the port and starboard sides of the boat, the two sides become molded in a permanent manner such that the deck and hull of the boat are formed together as a unitary boat shell in a single process.

BRIEF DESCRIPTION OF THE DRAWINGS

It should be understood that the drawings are provided for the purpose of illustration only and are not intended to define the limits of the invention. The foregoing and other objects and advantages of the embodiments described herein will become apparent with reference to the following detailed description when taken in conjunction with the accompanying drawings in which.

DETAILED DESCRIPTION OF THE ILLUSTRATIVE EMBODIMENTS

Figure 1:
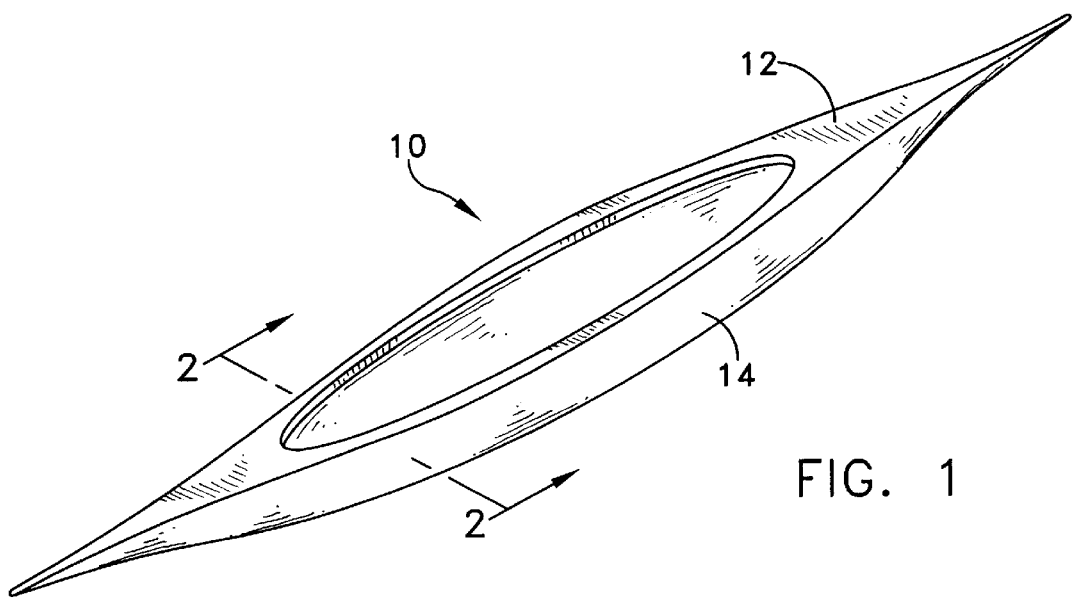
FIG. 1 is a perspective view of a rowing shell formed in accordance with the present invention.
Figure 2:
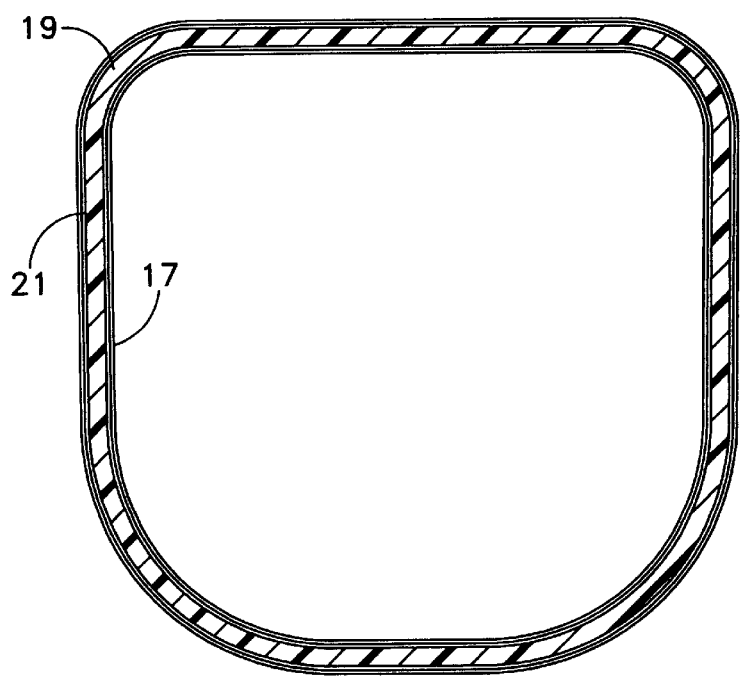
FIG. 2 is a cross-sectional view taken along lines 2—2 of FIG. 1.

A boat shell 10 having a deck 12 and a hull 14 molded together as a unitary member is illustrated in FIG. 1. To form the boat shell, a two part mold 16 (FIGS. 3 and 4) is preferably provided which includes a first mold half 18 and a second mold half 20 which are mirror images of each other. In an open position, prior to molding, the two halves 18, 20 are separated and materials which are used to form the inner layer 17, core 19 and outer layer 21 of the shell (FIG. 2), as described below, are laid up within each mold half. Prior to laying up the materials within the mold, cooperative inserts 22, 24 are removably secured to opposing upper 26a, 26b and lower 28a, 28b edges of the first and second mold halves. The inserts are provided to facilitate joining the first and second halves of the boat shell together along a centerline during molding, by allowing ends of the inner and outer layers 32, 30 of material in the first mold half to overlap ends of the inner and outer layers 34, 36 of material in the second mold half. After lay up of the material is completed, the inserts are removed and the mold is closed by bringing the opposing upper and lower edges together.

Figure 3:
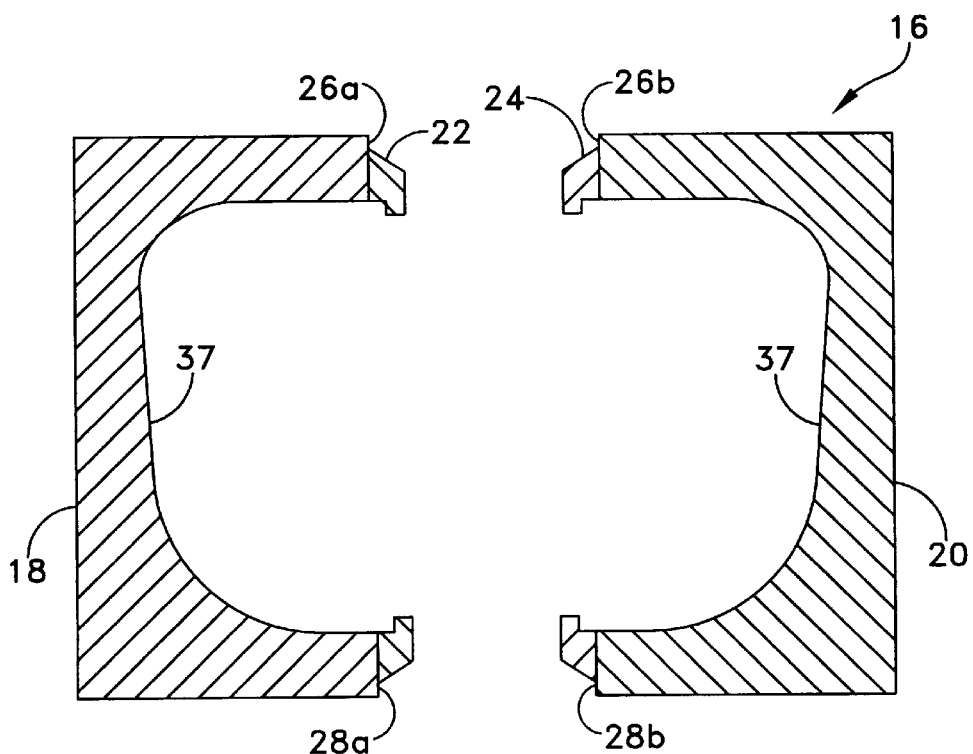
FIG. 3 is a cross-sectional view of the mold used to form the shell of FIG. 1 in an open position, including temporary mold inserts.
Figure 4:
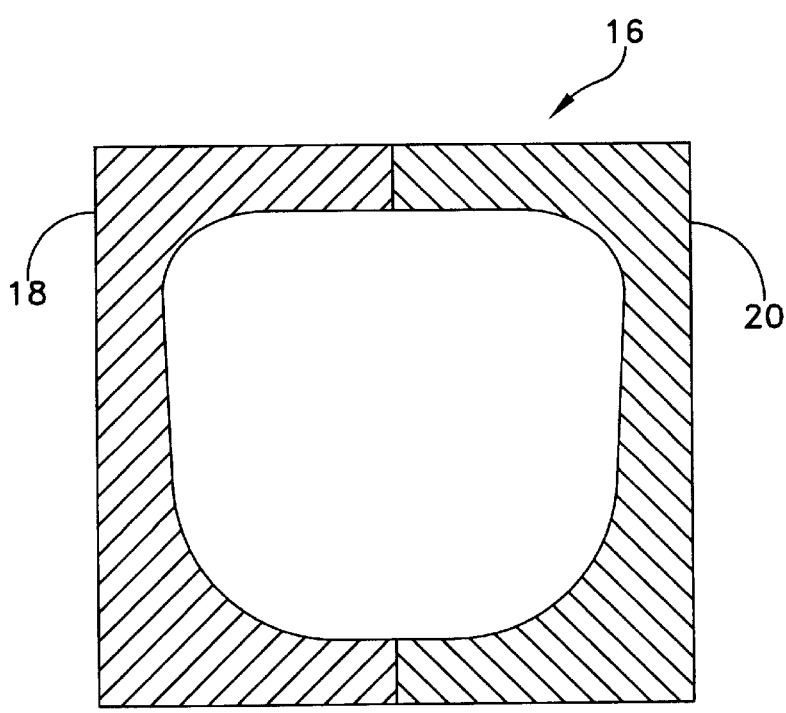
FIG. 4 is a cross-sectional view of the mold of FIG. 3, in a closed position, without inserts.
Figure 5:
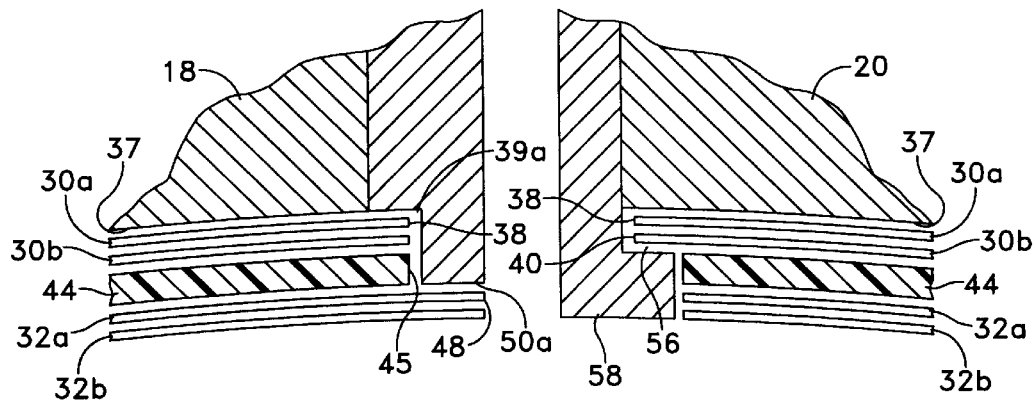
FIG. 5 is an enlarged, partial cross-sectional view of the mold of FIG. 3 during lay up of the shell material.
Figure 6:
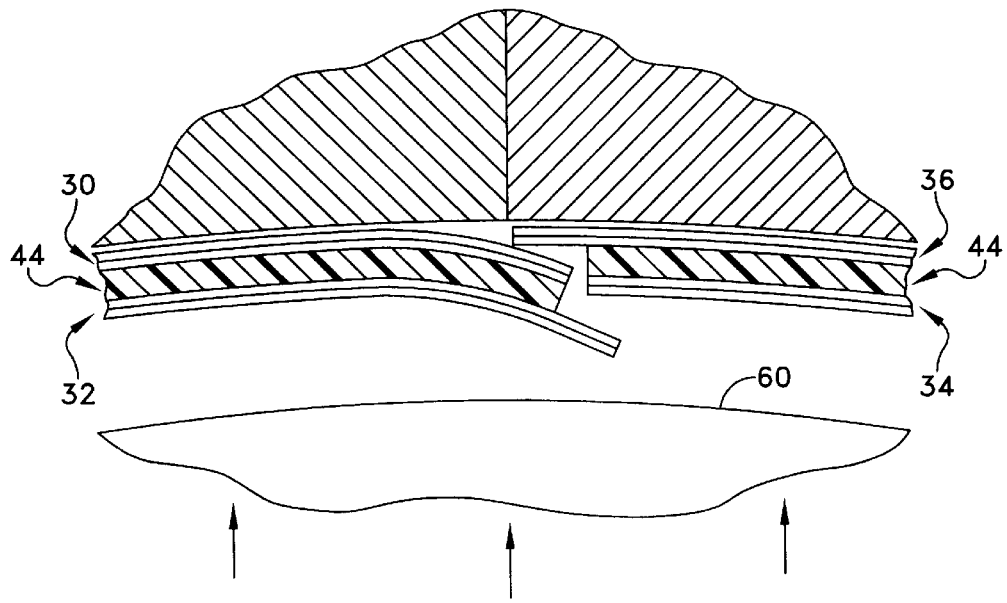
FIG. 6 is an enlarged, partial cross-sectional view of the mold of FIG. 4 during molding.

In the closed position, as shown in FIG. 6, the inner and outer layers of material in the first mold half overhang the upper and lower edges of the first mold half, while the outer layer of material in the second mold half is set back from the upper and lower edges of the second mold half and the inner layer is flush with the edge of the mold. Thus, the inner and outer layers of material in one mold half overlap the inner and outer layers of material in the other mold half in order to form a reinforced seam along the centerline of the boat shell. The upper and lower inserts are also configured such that the core material within the first mold half abuts the core material within the second mold half when the mold is closed. In the present embodiment, the inserts used on the first mold half include a stepped configuration such that the edges of the mold are effectively lengthened, while the inserts used on the second mold half are generally L-shaped, and abut the edges of the second mold half as shown in FIGS. 3 and 5. The inserts are removably secured to the upper and lower edges of the mold halves in any known manner, for example by using pins or bolts. The lower inserts preferably extend along substantially the entire length of both mold halves in an uninterrupted manner, while the upper inserts are preferably interrupted for a length sufficient to form an opening in the deck for receipt of the seat deck of the boat. The seat deck is molded in a separate operation and is preferably attached to the deck by adhesive in a known manner. Reference will now be made to the manner in which the materials forming the outer layer, core and inner layer of the boat are laid up within the mold.

In a preferred embodiment, a first layer 30a of material, such as carbon-fiber tape which is pre-impregnated with a resin and includes an adhesive pre-applied on one side thereof, is positioned against an inner surface 37 of the first mold half 18 so that it substantially covers the inner surface of the mold. A first end 38 of the tape preferably abuts the stepped portion 39a of the upper temporary insert, while a second end (not shown) of the tape abuts the stepped portion of the lower temporary insert. The tape is manually smoothed in order to substantially eliminate any bumps, ridges or air which may be trapped between the inner surface of the first mold half and the tape. This step is then repeated with a second layer 30b of carbon-fiber impregnated tape which is placed onto the first layer. The first and second layers together form the outer layer 21 of the boat shell once molded. Thereafter, a layer of material 44, for example honeycomb, is placed onto the second layer of material, such that the honeycomb layer substantially covers the entire surface of the second layer of material. The honeycomb layer also has a first 45 and a second end which abut the stepped portion of the upper and lower temporary inserts, and is likewise manually smoothed. A third layer 32a of carbon fiber tape is then placed onto the honeycomb, the adhesive surface of the tape contacting the honeycomb, such that the honeycomb core 44 is sandwiched between the first and second layers of carbon-fiber tape and the third layer of tape. A first end 48 of the third layer of material contacts a bottom surface 50a of the upper temporary insert, while a second end (not shown) of the material contacts a bottom surface of the lower temporary insert. The third layer is likewise manually smoothed. This step is then repeated with a fourth layer 32b of carbon-fiber impregnated tape which is placed onto the third layer. The third and fourth layers together form the inner layer 19 of the boat shell. Other patches of carbon fiber material may be selectively applied along the mold, at areas where greater forces on the boat shell are experienced, for example, where the riggers are attached, as would be known to one of skill in the art. The entire process is then repeated in substantially the same manner with the second mold half 20. The only difference in laying up the material in the second mold half 20 relates the configuration of the upper and lower temporary inserts of the second mold half as described above.

Referring now to FIG. 5, when the first and second layers 30a,b of material are laid up within the second mold half 20, the first and second ends 38, 40 of the layers are positioned within a space 56 formed between the leg 58 of the L-shaped temporary insert and the inner surface 37 of the second mold half, but preferably do not extend beyond the upper and lower edges of the mold half. The honeycomb material and the third and fourth layers preferably abut the leg portion of the L-shaped inserts, and are therefore set back from the upper and lower edges of the mold half. In this manner, when the mold is closed as described above, the outer and inner layers of the first mold half will overlap the outer and inner layers of the second mold half, while the core material of each half will abut. In the present embodiment, the layers preferably overlap about 10–15 mm, although this may be adjusted, as desired. Although the process is described using carbon fiber impregnated tape and a honeycomb matrix material, other materials may readily be utilized as would be known to one of skill in the art. In the present embodiment, the carbon fiber tape is preferably unidirectional and is impregnated with resin, such tape being commercially available from Toray Co., product number T300 or T700, the resin system being available from YLA, Inc., product number RS-1, and the honeycomb matrix material being 48 kg/m$^3$ 3 mm cell, available under the tradename NOMEX™ and manufactured by Plascore.

After the materials are laid up and the molds are closed, vacuum pressure is applied to the mold by an internal bag 60, which removes air from the mold to create a vacuum at a pressure of about 0.95 atm. The boat shell is thereafter cured at a temperature of about 100° C. for about 4 hours until set, the mold is opened and the shell is removed. During curing, the epoxy which was pre-impregnated within the carbon fiber tape is heated and begins to flow between the honeycomb and the various layers of tape, thereby molding the port and starboard sides of the boat together in a permanent manner, and likewise molding the hull and deck together in a permanent manner thereby forming a unitary member in a single process. The resulting unitary shell has improved stiffness, about twice that of conventional shells where the deck and hull are cured separately and thereafter joined together by adhesive. The shell is then finished, for example by applying the seat deck, skeg and riggers, etc. as would be conventional. In the present embodiment, a single person boat shell is formed having the following approximate dimensions: overall length from bow to stern about 7.7 meters (7.67 meters at waterline), width about 400 mm at greatest point and about 256 mm at waterline; wetted surface comparison 4%<Empacher, 1.3%>Van Deusen, although other dimensions and size boats (lightweight or heavyweight) may be made by the described process, as would be known to one of skill in the art.

It will be understood that various modifications may be made to the embodiment disclosed herein. For example, the boat shell may be used for rowing, sculling or any other type of boat. In addition, all dimensions are approximate and may be varied as would be known to one of skill in the art. Therefore, the above description should not be construed as limiting, but merely as exemplifications of a preferred embodiment. Those skilled in the art will envision other modifications within the scope spirit of the invention.

What is claimed is:

1. A process for fabricating a boat shell comprising the steps of:

providing a two part boat shell mold including a first mold half and a second mold half;

separating the first mold half from the second mold half;

removably securing cooperative inserts to opposing upper and lower edges of the first and second mold halves so as to facilitate joining of the first and second mold halves during molding;

laying up material within the first mold half and the second mold half, the material including an inner layer, a core, and an outer layer of material;

removing the cooperative inserts from the first and second mold halves;

closing the mold by bringing the opposing upper and lower edges of the first and second mold halves together such that material laid up in the first mold half overhangs the upper and lower edges of the first mold half and further overlaps a portion of the material laid up in the second mold half so as to form a reinforced seam along a centerline of the molded boat shell, and wherein the material forming the outer layer of the second mold half is set back from the upper and lower edges of the second mold half upon closing the mold;

creating a vacuum within the mold; and heating the material until the boat shell is cured.

2. The process according to claim 1, wherein the first mold half is a mirror image of the second mold half.

3. The process according to claim 1, wherein the material in the first mold half defines one side of the boat shell from bow to stern, and the material in the second mold half defines the other side of the boat shell from bow to stern.

4. The process according to claim 1, wherein the inner layer comprises at least one layer of pre-impregnated material, the core comprises at least one layer of a honeycomb matrix, and the outer layer comprises at least one layer of pre-impregnated material.

5. The process according to claim 4, wherein the pre-impregnated material of the inner and outer layers is a carbon fiber material.

6. The process according to claim 1, wherein the material forming the inner layer of the second mold half is flush with the upper and lower edges of the second mold half upon closing the mold.

7. The process according to claim 6, wherein the core material within the first mold half abuts the core material within the second mold half upon closing the mold.

8. The process according to claim 1, wherein the vacuum is created by an internal vacuum bag.

9. The process according to claim 1, further comprising the step of removing the cured boat shell having a deck and hull from within the two part mold.

10. A process for fabricating a boat shell comprising the steps of:

providing a two part mold including a first mold half and a second mold half, the first and second mold halves being mirror images of each other and each including an upper and a lower edge;

removably securing an insert to the upper edge and lower edge of the first mold half;

removably securing an insert to the upper edge and lower edge of the second mold half;

applying at least a first layer of a material pre-impregnated with a resin against an inner surface of the first mold half and the second mold half so that the material substantially covers the inner surface;

placing at least a second layer of material onto the at least first layer of material, the second layer of material having a plurality of openings therein forming a matrix;

applying at least a third layer of a material pre-impregnated with a resin over the at least second layer of material, such that the at least second layer of material is sandwiched between the at least first layer and the at least third layer;

removing the inserts from the first and second mold halves;

closing the mold by bringing the opposing upper edges of the first mold half and the second mold half together, and the opposing lower edges of the first mold half and the second mold half together, such that the at least first layer and the at least third layer of material in the first mold half overhangs the upper and lower edges of the first mold half and further overlap a portion of the corresponding at least first layer and at least third layer of material in the second mold half, and wherein the at least second layer of the first and second mold halves abut;

applying a vacuum pressure within the closed mold; and heating the material until the boat shell is cured.

11. The process according to claim 10, wherein the at least first layer of material defines the outer layer of the molded boat shell, the at least second layer defines the core of the molded boat shell, and the at least third layer defines the inner layer of the molded boat shell.

12. The process according to claim 10, wherein the at least first layer comprises two layers of pre-impregnated carbon fiber material, and the at least third layer comprises two layers of pre-impregnated carbon fiber material.

13. The process according to claim 12, wherein the at least second layer comprises a layer of a honeycomb matrix material.

14. The process according to claim 10, wherein the material forming the outer layer of the second mold half is set back from the upper and lower edges of the second mold half upon closing the mold.

15. The process according to claim 10, wherein the insert removably secured to the first mold half has a stepped configuration and the insert removably secured to the second mold half has a generally L-shaped configuration.

16. The process according to claim 10, wherein the vacuum is created by an internal vacuum bag.

17. The process according to claim 10, further comprising the step of removing the cured boat shell having a deck and hull from within the two part mold.

18. A process for fabricating a boat shell comprising the steps of:

providing a two part mold including a first mold half and a second mold half;

separating the first mold half from the second mold half;

removably securing cooperative inserts to opposing upper and lower edges of the first and second mold halves so as to facilitate joining of the first and second mold halves during molding wherein the insert removably secured to the first mold half has a stepped configuration and the insert removably secured to the second mold half has a generally L-shaped configuration;

laying up material within the first mold half and the second mold half;

removing the cooperative inserts from the first and second mold halves;

closing the mold by bringing the opposing upper and lower edges of the first and second mold halves together such that material laid up in the first mold half overhangs the upper and lower edges of the first mold half and further overlaps a portion of the material laid up in the second mold half so as to form a reinforced seam along a centerline of the molded boat shell;

creating a vacuum within the mold; and heating the material until the boat shell is cured.

* * * * *